(12) United States Patent
Na'im et al.

(10) Patent No.: US 8,551,253 B2
(45) Date of Patent: Oct. 8, 2013

(54) POST POLISH DISK CLEANING PROCESS

(75) Inventors: Nazman Na'im, Johor Bahru (MY); Yeong Yih Boo, Jaya (MY)

(73) Assignee: WD Media, LLC, San Jose, CA (US)

( * ) Notice: Subject to any disclaimer, the term of this patent is extended or adjusted under 35 U.S.C. 154(b) by 233 days.

(21) Appl. No.: 12/826,300

(22) Filed: Jun. 29, 2010

(65) Prior Publication Data

US 2011/0315162 A1 Dec. 29, 2011

(51) Int. Cl.
*B08B 7/00* (2006.01)
(52) U.S. Cl.
USPC .......... 134/6; 134/1; 134/11; 134/21; 134/23; 134/26; 134/30; 134/31; 134/33; 134/34; 134/35; 134/36; 134/42; 134/902; 15/77; 15/88.2; 15/102; 451/54; 451/57; 451/63; 451/DIG. 910
(58) Field of Classification Search
USPC .............. 134/1, 6, 11, 21, 23, 26, 30, 31, 33, 134/34, 35, 36, 42, 902; 15/77, 88.2, 102; 451/54, 57, 63, DIG. 910
See application file for complete search history.

(56) References Cited

U.S. PATENT DOCUMENTS

| | | | |
|---|---|---|---|
| 5,442,828 A * | 8/1995 | Lutz | 15/88.3 |
| 5,475,889 A | 12/1995 | Thrasher et al. | |
| 5,639,311 A * | 6/1997 | Holley et al. | 134/6 |
| 5,996,594 A | 12/1999 | Roy et al. | |
| 6,059,888 A | 5/2000 | Hillman | |
| 6,214,699 B1 * | 4/2001 | Joyner | 438/445 |
| 6,240,588 B1 * | 6/2001 | Dickey et al. | 15/88.3 |
| 6,294,027 B1 * | 9/2001 | Li et al. | 134/3 |
| 6,303,551 B1 * | 10/2001 | Li et al. | 510/175 |
| 6,308,576 B1 | 10/2001 | Yeh et al. | |
| 6,319,330 B1 * | 11/2001 | Jiang et al. | 134/2 |
| 6,334,229 B1 * | 1/2002 | Moinpour et al. | 15/77 |
| 6,423,149 B1 * | 7/2002 | Crevasse et al. | 134/6 |
| 6,616,516 B1 * | 9/2003 | Ravkin et al. | 451/194 |
| 6,637,446 B2 * | 10/2003 | Frost et al. | 134/184 |
| 6,733,596 B1 * | 5/2004 | Mikhaylichenko et al. | 134/6 |
| 6,739,013 B2 | 5/2004 | Glashauser et al. | |
| 6,886,387 B1 | 5/2005 | Lin et al. | |
| 7,507,296 B2 | 3/2009 | Sugarman et al. | |
| 2003/0136431 A1 * | 7/2003 | Scranton et al. | 134/63 |
| 2003/0145874 A1 * | 8/2003 | Myland | 134/6 |
| 2003/0154999 A1 * | 8/2003 | Shih et al. | 134/1.3 |
| 2005/0223588 A1 * | 10/2005 | Hansen | 34/351 |
| 2009/0320875 A1 * | 12/2009 | Martinez et al. | 134/1.3 |
| 2010/0119702 A1 * | 5/2010 | Peinovich | 427/127 |

* cited by examiner

*Primary Examiner* — Bibi Carrillo

(57) ABSTRACT

A method for cleaning plated polished disks used in hard drive media is provided. The method includes positioning plated polished disks in a first batch scrubber having multiple first brushes, wherein each of the plated polished disks is positioned between two of the first brushes, and scrubbing the plated polished disks with the first brushes. The method further includes positioning the plated polished disks scrubbed in the first batch scrubber in a second batch scrubber having multiple second brushes, wherein each of the plated polished disks is positioned between two of the second brushes, and scrubbing the plated polished disks with the second brushes.

19 Claims, 4 Drawing Sheets

POST POLISH DISK CLEANING PROCESS

FIELD

The present disclosure generally concerns cleaning processes used during the manufacturing of disks used in hard drive media and, more particularly, cleaning processes used after polishing plated disks.

BACKGROUND

Disks used in hard drive media include a substrate that is plated with a material such as nickel. The plated disks are subsequently polished using chemical mechanical polishing. The surfaces of the disks are exposed to contamination from the polish slurry, the polish residue, the manufacturing equipment, and the manufacturing environment. In particular, the polish slurry has a tendency to bond to the surface of the disks making contamination particles from the slurry difficult to remove. If contamination particles are not removed from the surface of the plated polished disk, the operation and performance of hard drive incorporating the disk may be negatively impacted.

SUMMARY

According to one aspect of the present disclosure, a method for cleaning plated polished disks used in hard drive media is provided. The method includes positioning a plurality of plated polished disks in a first batch scrubber comprising a first plurality of brushes, wherein each of the plurality of plated polished disks is positioned between two of the first plurality of brushes, and scrubbing the plurality of plated polished disks with the first plurality of brushes. The method further includes positioning the plurality of plated polished disks scrubbed in the first batch scrubber in a second batch scrubber comprising a second plurality of brushes, wherein each of the plurality of plated polished disks is positioned between two of the second plurality of brushes, and scrubbing the plurality of plated polished disks with the second plurality of brushes.

According to another aspect of the present disclosure, a method for cleaning plated polished disks used in hard drive media is provided. The method includes soaking a plurality of plated polished disks in an ultrasonic bath, positioning the plurality of plated polished disks soaked in the ultrasonic bath in a first batch scrubber comprising a first plurality of PVA brushes, wherein each of the plurality of plated polished disks is positioned between two of the first plurality of PVA brushes, and scrubbing the plurality of plated polished disks with the first plurality of PVA brushes and a liquid cleaning solution. The method further includes positioning the plurality of plated polished disks scrubbed in the first batch scrubber in a second batch scrubber comprising a second plurality of PVA brushes, wherein each of the plurality of plated polished disks is positioned between two of the second plurality of PVA brushes, and scrubbing the plurality of plated polished disks with the second plurality of PVA brushes and the liquid cleaning solution. The plurality of plated polished disks scrubbed by the first and second pluralities of PVA brushes is rinsed with de-ionized water in a rinse tank, and dried with nitrogen in a dryer.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components have been simplified or omitted from the figures to avoid obscuring the concepts of the subject technology.

The subject technology provides a post-polish cleaning process for disks used in hard drive media. Disks used in hard drive media are plated with a material, such as nickel, using a sputtering process. Once the disks have been plated, the disks are polished to provide an even, uniform surface. The plated disks may be polished using chemical mechanical polishing. However, chemical mechanical polishing introduces a number of possible contaminants to the disks. For example, polishing slurry, polish residue, and exposure to the manufacturing environment and machinery all potentially leave contamination particles embedded in the surfaces of the plated disks. Polishing slurry in particular may bond to the disk surfaces making it difficult, if not impossible, to remove using conventional post-polish scrubbing systems and processes.

Figure 1:
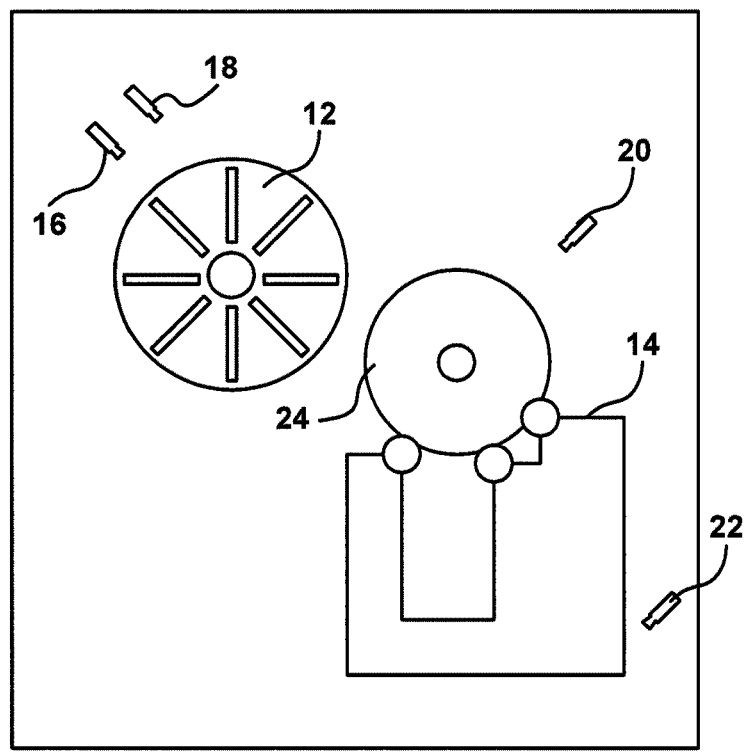
FIG. 1 diagram illustrating components of a batch scrubber according to one aspect of the subject technology.

The subject technology uses a modular cleaning system that incorporates a dual batch scrubbing process to clean plated disks after the disks have been polished. According to one aspect of the subject technology, one or more batch scrubbers are integrated into the modular cleaning system to perform the dual batch scrubbing process. FIG. 1 is a diagram illustrating components of a batch scrubber according to one aspect of the subject technology. As shown in FIG. 1, batch scrubber 10 includes brushes 12, rolling comb system 14, cleaning solution sprayer 16, and de-ionized water sprayers 18, 20, and 22.

Rolling comb system 14 is configured to support multiple plated disks 24 in an arrangement that keeps them uniformly separated from one another and aligned with a common axis extending through the central openings of each of plated disks 24 and perpendicular to the surfaces of plated disks 24. In addition to keeping plated disks 24 separated from one another, rolling comb system 14 allows plated disks 24 to rotate about the common axis. Batch scrubber 10 and rolling comb system 14 may be configured to support 25 to 50 plated disks 24 in a single batch. The subject technology is not limited to this range, however, and batch scrubber 10 may be configured to support a single batch of disks greater than 50 or less than 25.

Figure 2:
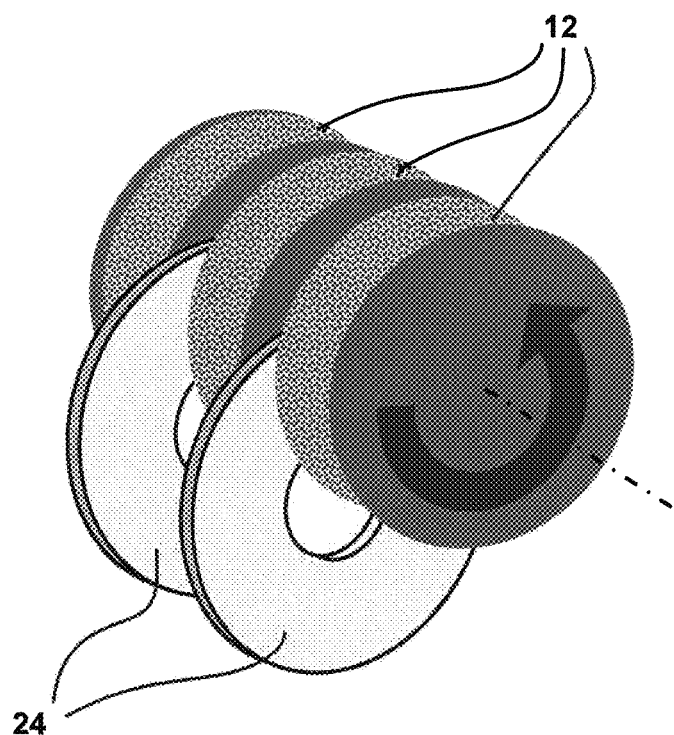
FIG. 2 is a diagram illustrating an arrangement of brushes and disks within a batch scrubber according to one aspect of the subject technology.

Brushes 12 are configured to be positioned between plated disks 24 and in contact with the surfaces of plated disks 24. For example, each brush 12 may be double sided and positioned between two adjacent plated disks 24. This arrangement is illustrated in FIG. 2. As shown in FIG. 2, a pair of plated disks 24 and three brushes 12 are positioned such that each plated disk 24 is positioned between and in contact with the cleaning surfaces of two adjacent brushes 12. Brushes 12 are configured to be driven and rotated in the direction shown by the arrow in FIG. 2 to scrub the surfaces of plated disks 24. The rotation of brushes 12 causes plated disks 24 to rotate on rolling comb system 14, which allows the entire surface of each plated disk 24 to be scrubbed by brushes 12 even though only a portion of the surface of each plated disk 24 is in contact with brushes 12 at any given time. The number of brushes 12 will vary depending on the number of plated disks 24 batch scrubber 10 is configured to scrub in a single batch.

Each of brushes 12 may be a PVA brush with opposing brush surfaces mounted on and supported by a core. The core improves the rigidity of the brush structure thereby allowing a more steady pressure to be applied by the brush surfaces to the surfaces of the plated disks. The subject technology is not limited to this brush structure and may be implemented using other brush structures.

A liquid cleaning solution is sprayed on brushes 12 by sprayer 16 at different times during a scrubbing cycle. While not depicted in FIG. 1, sprayer 16 is coupled to a liquid cleaning solution delivery system that may include a reservoir for containing the liquid cleaning solution, delivery lines connecting the reservoir to sprayer 16, and a pump for delivering the liquid cleaning solution to sprayer 16 via the delivery lines. The liquid cleaning solution includes a detergent diluted to a desired concentration. The concentration may be between 3% and 5%. The subject technology is not limited to any particular detergent or concentration.

Sprayers 18, 20, and 22 are configured to spray de-ionized water on different portions of batch scrubber 10 during a scrubbing cycle. Sprayer 18 is configured to spray de-ionized water on brushes 12 to keep brushes 12 wet and to help rinse contaminants removed from the surfaces of plated disks 24 from brushes 12 during and between scrubbing cycles. Sprayer 20 is configured to spray de-ionized water on plated disks 24 to keep them wet while mounted in batch scrubber 10. Sprayer 22 is configured to spray de-ionized water on the lower portions of the interior of batch scrubber 10 to help dissipate any bubbles that may form and build up as the liquid cleaning solution and de-ionized water runs off brushes 12 and plated disks 24 during a scrubbing cycle. While not depicted in FIG. 1, sprayers 18, 20, and 22 are coupled to one or more pumps and delivery lines for supplying the de-ionized water to the respective sprayers.

Figure 3:
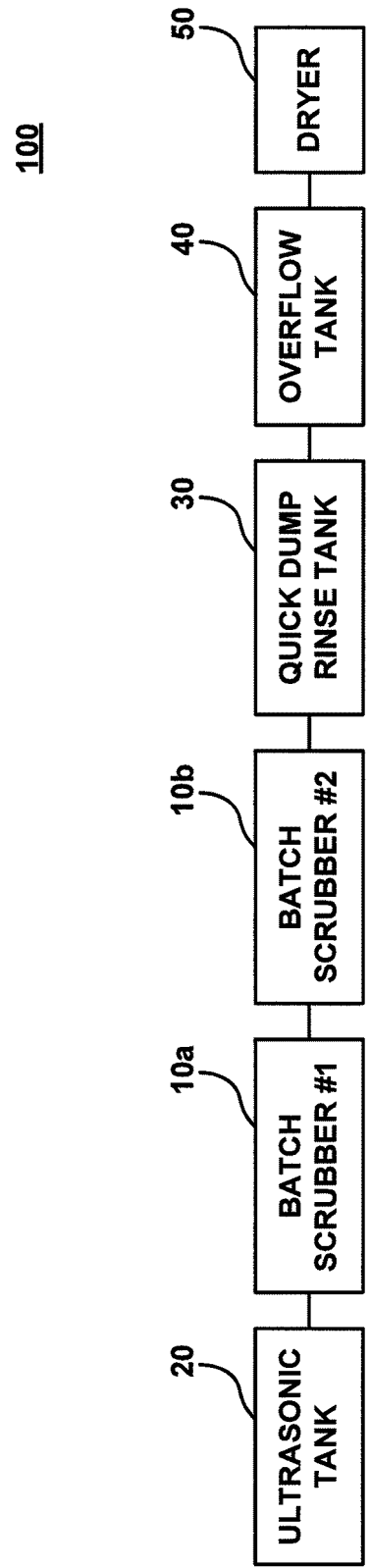
FIG. 3 is a block diagram illustrating components of a modular cleaning system according to one aspect of the subject technology.

FIG. 3 is a block diagram illustrating components of modular cleaning system 100 according to one aspect of the subject technology. Modular cleaning system 100 is configured to be used for post polish cleaning of plated disks used in hard drive media. Modular cleaning system 100 includes ultrasonic tank 20, first batch scrubber 10a, second batch scrubber 10b, quick dump rinse tank 30, overflow tank 40, and dryer 50. A batch of plated disks 24 may be positioned in each of these components and moved between components during a post-polish cleaning operation manually by one or more operators or using an automated mechanical handling and transport system. Automated handling and transport systems are well known in the manufacturing industry and therefore will not be described in detail herein.

Figure 4:
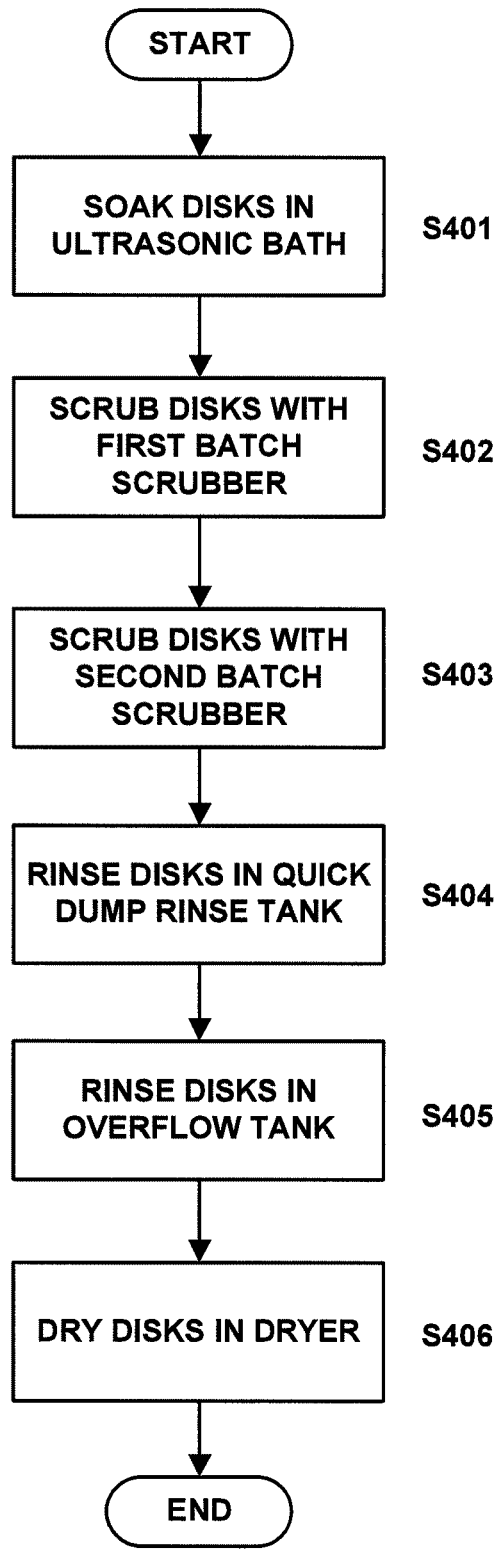
FIG. 4 is a flowchart illustrating a process for cleaning plated disks according to one aspect of the subject technology.

FIG. 4 is a flowchart illustrating an cleaning process utilizing modular cleaning system 100. The cleaning process represented in FIG. 4 begins when a batch of plated disks 24 has completed the polishing process. In step S401, the batch of plated disks 24 is loaded into ultrasonic tank 20 and soaked for a period of time. Plated disks 24 are immersed in a liquid in ultrasonic tank 20. The liquid may be de-ionized water, which may include a chemical or detergent to assist in cleaning plated disks 24. The liquid in ultrasonic tank 20 is agitated using a sonication system to dislodge contamination particles from the surfaces of plated disks 24. The liquid in ultrasonic tank 20 is circulated and filtered to remove the dislodged contamination particles before circulating the liquid back into ultrasonic tank 20. Plated disks 24 may be soaked in ultrasonic tank 20 for a period of 1 to 2 minutes. However, the subject technology is not limited to the time range for soaking plated disks 24. In addition, the subject technology is not limited to any particular frequency or power applied by the sonication system to the liquid, nor is it limited to any particular liquid or flow rate for circulating the liquid.

After plated disks 24 have been soaked in ultrasonic bath 20, the batch of plated disks 24 is removed from ultrasonic bath 20 and positioned in first batch scrubber 10a in step S402. Step S402 further includes scrubbing the batch of plated disks 24 in the manner described above using first batch scrubber 10a. The scrubbing cycle in first batch scrubber 10a may be between 30 and 60 seconds.

In step S403, the batch of plated disks 24 is removed from first batch scrubber 10a and positioned in second batch scrubber 10b. Step S403 further includes scrubbing the batch of plated disks 24 in the manner described above using second batch scrubber 10b. The scrubbing cycle in second batch scrubber 10b may be between 30 and 60 seconds.

The subject technology utilizes a dual batch scrubbing process using first batch scrubber 10a and second batch scrubber 10b to more effectively and efficiently clean plated disks 24 after polishing has been completed. The use of batch scrubbers allows plated disks to be cleaned simultaneously in batches rather than using single disk scrubbing systems. This allows scrub cycle times to be increased while maintaining or improving overall throughput of the system compared to single disk scrubbing systems. Furthermore, the arrangement of the brushes and plated disks within the batch scrubbers allows more pressure to be safely applied to the surfaces of the disks by the brushes which, when combined with a possible increase in scrubbing cycles, may increase the amount of contaminants removed from the disk surfaces.

The first batch scrubbing cycle cleans contamination particles that are easily removed from the surface of the plated disks. The second batch scrubbing cycle continues to remove contamination particles from the surface of the plated disks after the first batch scrubbing cycle. The brushes in the batch scrubbers may capture and become loaded with the contaminants removed from the disk surfaces. The contaminants loaded in the brushes may reattach to the disk surfaces as the scrubbing cycle continues. By utilizing a dual batch scrubbing process, a first set of brushes may remove the majority of the contaminants while a second set of brushes, which are not loaded up with the initially removed contaminants, may remove more stubborn contamination particles embedded in the disk surfaces while reducing the risk previously removed particles become reattached to the disk surfaces.

The subject technology is not limited to a configuration of modular cleaning system 100 including separate first batch scrubber 10a and second batch scrubber 10b. A single batch scrubber containing two sets of brushes also may be used to provide the dual batch scrubbing process of the subject technology.

In step S404, the batch of plated disks 24 is removed from second batch scrubber 10b and placed in quick dump rinse tank 30. Quick dump rinse tank 30 is filled with de-ionized water using a high pressure fill mechanism to immerse the batch of plated disks 24. The de-ionized water may be allowed to overfill and overflow from quick dump rinse tank 30. The batch of plated disks 24 may be left immersed in the de-ionized water for a dwell period prior to quick dump rinse tank 30 being quickly drained of the de-ionized water. The quick fill and drain action of quick dump rinse tank 30 provides another mechanism to rinse contamination particles and chemical residue from the surfaces of plated disks 24.

In step S405, the batch of plated disks 24 is removed from quick rinse dump tank 30 and placed in overflow tank 40. The batch of plated disks 24 is immersed in de-ionized water in overflow tank 40. De-ionized water is continually pumped into overflow tank 40, which causes the de-ionized water to fill overflow tank 40 and overflow out of overflow tank 40. This overflow action of the de-ionized water rinses chemical residue from the surfaces of plated disks 24 that may not have been removed by the rinse performed in quick dump rinse tank 30.

In step S406, the batch of plated disks 24 is removed from overflow tank and placed in dryer 50 to be dried. In dryer 50, the batch of plated disks 24 is placed on a mechanical comb system and immersed in de-ionized water. The mechanical comb system gradually elevates the batch of plated disks 24 from the de-ionized water as dryer sprays the batch of plated disks 24 with nitrogen gas to dry the surfaces of plated disks 24. The de-ionized water may be maintained at a temperature of between 25 degrees Celsius and 30 degrees Celsius. The nitrogen gas may be heated to between 70 degrees Celsius and 100 degrees Celsius (e.g., 90 degrees Celsius). The subject technology is not limited to the these temperature ranges for the de-ionized water or the nitrogen gas. The process ends after the batch of plated disks 24 have been dried by dryer 50.

As discussed above, the dual batch scrubbing process provides improved cleaning efficacy and efficiency for post-polish cleaning processes for plated disks. Improving the cleaning of plated disks at this stage of the manufacturing process helps to improve operability, performance, and durability of hard drives incorporating the plated disks as hard drive media. The dual batch scrubbing processes further improves the throughput of post-polish cleaning by utilizing a batch cleaning system rather than an individual disk cleaning system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for cleaning plated polished disks used in hard drive media, the method comprising:
    positioning a plurality of plated polished disks in a first batch scrubber comprising a first plurality of brushes, wherein each of the plurality of plated polished disks is positioned between two of the first plurality of brushes;
    scrubbing the plurality of plated polished disks with the first plurality of brushes in the first batch scrubber, wherein at least one brush in the first batch scrubber contacts an upper surface of a first polished disk and a lower surface of a second polished disk of at least two polished disks;
    positioning the plurality of plated polished disks scrubbed in the first batch scrubber in a second batch scrubber comprising a second plurality of brushes, wherein each of the plurality of plated polished disks is positioned between two of the second plurality of brushes; and
    scrubbing the plurality of plated polished disks with the second plurality of brushes wherein at least one brush in the second batch scrubber contacts an upper surface of the first polished disk and a lower surface of the second polished disk of said at least two polished disks.

2. The method for cleaning plated polished disks according to claim 1, wherein scrubbing the plurality of plated polished disks with the first plurality of brushes further comprises applying a liquid cleaning solution to the first plurality of brushes, and wherein scrubbing the plurality of plated polished disks with the second plurality of brushes further comprises applying the liquid cleaning solution to the second plurality of brushes.

3. The method for cleaning plated polished disks according to claim 1, wherein the first plurality of brushes comprises PVA brushes supported by respective cores.

4. The method for cleaning plated polished disks according to claim 1, wherein the second plurality of brushes comprises PVA brushes supported by respective cores.

5. The method for cleaning plated polished disks according to claim 1, further comprising soaking the plurality of plated polished disks in an ultrasonic bath.

6. The method for cleaning plated polished disks according to claim 1, further comprising:
submerging the plurality of plated polished disks in de-ionized water;
elevating the plurality of plated polished disks from the de-ionized water; and
drying the plurality of plated polished disks by spraying the plurality of plated polished disks with a gas as the plurality of plated polished disks is elevated from the de-ionized water.

7. The method for cleaning plated polished disks according to claim 1, further comprising:
submerging the plurality of plated polished disks in de-ionized water;
pulling the plurality of plated polished disks from the de-ionized water; and
drying the plurality of plated polished disks as the plurality of plated polished disks is pulled from the de-ionized water.

8. The method for cleaning plated polished disks according to claim 1,
wherein positioning the plurality of plated polished disks in the first batch scrubber comprises supporting the plurality of plated polished disks on a first rolling comb system; and
positioning the plurality of plated polished disks in the second batch scrubber comprises supporting the plurality of plated polished disks on a second rolling comb system.

9. The method for cleaning plated polished disks according to claim 2, wherein scrubbing the plurality of plated polished disks with the first plurality of brushes comprises rotating the first plurality of brushes along respective faces of the plurality of plated polished disks, and scrubbing the plurality of plated polished disks with the second plurality of brushes comprises rotating the second plurality of brushes along the respective faces of the plurality of plated polished disks.

10. The method for cleaning plated polished disks according to claim 5, wherein the plurality of plated polished disks are soaked in the ultrasonic bath for a duration of 1 to 2 minutes.

11. The method for cleaning plated polished disks according to claim 6, wherein spraying the plurality of plated polished disks with said gas comprises spraying the plurality of polished disks with nitrogen.

12. The method for cleaning plated polished disks according to claim 6, wherein the deionized water in which the plurality of plated polished disks is submerged is disposed in a rinse tank.

13. The method for cleaning plated polished disks according to claim 6, wherein drying the plurality of plated polished disks comprises spraying the plurality of plated polished disks with nitrogen gas.

14. The method of cleaning plated polished disks according to claim 8,
wherein the first rolling comb system is configured to align the plurality of plated polished disks in the first batch scrubber along a common axis extending through a central portion of each of the plated polished disks in the first batch scrubber, and
wherein the second rolling comb system is configured to align the plurality of plated polished disks in the second batch scrubber along a common axis extending through a central portion of each of the plated polished disks in the second batch scrubber.

15. The method for cleaning plated polished disks according to claim 9, wherein scrubbing the plurality of plated polished disks with the first plurality of brushes further comprises rinsing the first plurality of brushes and the plurality of plated polished disks with de-ionized water, and wherein scrubbing the plurality of plated polished disks with the second plurality of brushes further comprises rinsing the second plurality of brushes and the plurality of plated polished disks with de-ionized water.

16. The method for cleaning plated polished disks according to claim 13, wherein the nitrogen gas is heated to between 70 degrees Celsius and 100 degrees Celsius.

17. The method for cleaning plated polished disks according to claim 15, wherein the step of scrubbing the plurality of plated polished disks with the first plurality of brushes lasts between 30 and 60 seconds.

18. The method for cleaning plated polished disks according to claim 15, wherein the step of scrubbing the plurality of plated polished disks with the second plurality of brushes lasts between 30 and 60 seconds.

19. The method for cleaning plated polished disks according to claim 16, wherein the nitrogen gas is heated to 90 degrees Celsius.

* * * * *